3,579,481
CATALYST SYSTEM FOR POLYMERIZING
SATURATED, ALIPHATIC ALDEHYDES
Henricus Gerardus Josef Overmars, Zeist, and Jan Gerrit
Noltes, Utrecht, Netherlands, assignors to International
Lead Zinc Research Organization, Inc., New York,
N.Y.
No Drawing. Filed June 5, 1968, Ser. No. 734,576
Claims priority, application Netherlands, June 20, 1967,
6708558
Int. Cl. C08g *1/06, 1/08*
U.S. Cl. 260—67R                                    12 Claims

ABSTRACT OF THE DISCLOSURE

A catalyst system for polymerizing or copolymerizing aldehydes, comprising a mixture of (1) dialkylzinc, (2) a co-catalyst, such as alcohol, amine, or water, and (3) a stabilizing agent having the formula Aryl—NR—CO—R' wherein R represents hydrogen, alkyl, cycloalkyl, or aryl radicals, and R' represents alkyl, aryl, alkoxy, aryloxy or carbamate radicals.

---

This invention relates to a catalyst system for polymerizing aldehydes, and more particularly to a catalyst system incorporating a stabilizing agent.

Aldehydes have been polymerized using dialkylzinc as a catalyst and with water, alcohols, or amines as co-catalysts. The yields in highly crystalline polymer, however, have been unsatisfactory. In addition, if the catalyst was added quickly to the aldehyde the system became inactive.

It is therefore an object of this invention to provide an improved catalyst system for polymerizing aldehydes in which the yields in crystalline polymer are high.

According to the invention, an excellent catalyst system can be prepared in a short period of time by mixing the components, including dialkylzinc, a co-catalyst, such as water, alcohol or amine, and a stabilizing agent. The addition of this catalyst system to aldehydes induces a polymerization resulting in high yields of crystalline polymer.

The stabilizing agent is a compound of the formula Aryl—NR—CO—R', wherein Aryl may be a substituted or unsubstituted monocarbocyclicaryl radical such as phenyl, tolyl, or benzyl with substituents such as halogen, alkyl, nitro, alkoxy, and hydroxyalkyl; R represents hydrogen, alkyl, monocarbocyclicaryl, and cycloalkyl; and R' represents alkyl, monocarbocyclicaryl, alkoxy, monocarbocyclicaryloxy, or carbamate.

The alkyl group of the dialkylzinc may be for example, methyl, ethyl, propyl, isopropyl, butyl, isobutyl, tertiary butyl, pentyl, isopentyl or a higher hydrocarbon radical.

As a co-catalyst in the catalyst system it is preferred to use water, although alcohols and amines, especially secondary amines, are employable.

It is preferred to use 0.4 to 1.2 moles of the co-catalyst per mole of dialkylzinc. If more than 1.2 moles of co-catalyst are used per mole of dialkylzinc, the yield in polymer is strongly reduced.

The quantity of stabilizing agent per mole of dialkylzinc is less critical. A good yield may be obtained with 0.2 mole of stabilizing agent per mole of dialkylzinc. As much as 3 or 4 moles of stabilized per mole of dialkylzinc may also be used without difficulty.

A catalyst system comprising approximately equal numbers of moles of dialkylzinc, of co-catalyst, and stabilizing agent is the simplest to use in practice and at the same time is highly efficient.

The quantity of dialkylzinc in the catalyst system lies customarily between 0.01 and 5 mole percent. It is preferred, however, that between 0.1 and 1 mole percent dialkylzinc calculated on the aldehyde be used.

When the catalyst system is to be employed for polymerizing acetaldehyde, the yield in aldehyde polymer usually lies between 65 and 80 percent of the weight of the monomer used. The characteristic features of the use of the catalyst system are not only the high yield in polymer, but also the stereoregularity and high molecular weight. The polymer therefore shows a high crystallinity. Crystallinity can be expressed as a percentage of the total polymer which does not dissolve in methanol or acetone. In the system prepared according to the invention, a crystallinity of 95% and higher is generally found.

Because the system is oxygen-sensitive, it is preferred to employ an oxygen free atmosphere. Even if water is used as a co-catalyst, it is recommended that the chemicals and vessels be carefully dried in advance, because an excess of water will result in low yields.

In general, aldehyde polymerizations, such as that of acetaldehyde, are carried out at low to very low temperatures. At ambient temperatures, there will be no reaction with acetaldehyde for example. Processing is therefore customarily carried out at minus 78° C., since this is a well known temperature which can be achieved and maintained with solid carbonic acid and acetone. It is possible, however, to use temperatures to minus 40° C.

When low-melting aldehydes such as acetaldehyde are employed, the catalyst system may be utilized without resort to solvents. This procedure is not ideal, because the quantity of free liquid decreases as the polymerization progresses, and gives rise to the danger of an inhomogeneous reaction medium. It is therefore preferred that a solvent be used. Excess solvent is not harmful to the reaction, but is disadvantageous. Aprotic and non-complexing solvents, which are liquid at the low temperatures required for polymerization, are preferred. Such solvents include toluene, pentane and hexane. As a rule from 2 to 20 parts by volume of solvent per volume part of aldehyde may be used without difficulty.

The three components of the catalyst system should be present together at the beginning of the polymerization. The simplest method of preparing the catalyst system is to combine the three components in a solvent and to join the mixture with the aldehyde to be polymerized. It makes no difference in results as to what succession is chosen to introduce the three components into the solvent. It is therefore possible to bring the stabilizer into solution and then add the catalyst and co-catalyst. Other sequences are also employable.

If water is used as the co-catalyst and toluene as the solvent, the catalyst system initially will be cloudy. It is possible to obtain a homogeneous solution after a period of time has elapsed. In any event, the inhomogenity will totally disappear when the aldehyde to be polymerized has been added to the system. It is advantageous to stir the catalyst system for several minutes, 5 minutes for example, prior to adding the aldehyde.

The catalyst system may be stored for an indefinite period of time. There is no noticeable decline in the yield when the catalyst system is employed after an appreciable period of storage.

In the following examples three catalyst systems were prepared for use.

In catalyst system A, 1200 ml. of dry toluene and 20 mmoles of p-chloroacetanilide were introduced into a dry reaction vessel. The air was replaced by oxygen-free dry nitrogen. 20 mmoles of water and 20 mmoles of diethylzinc were introduced into the system while stirring.

In catalyst system B, 1200 ml. of dry toluene and 20 mmoles of diethylzinc were introduced into a dry reaction vessel. The reaction vessel was freed of oxygen beforehand by employing dry-oxygen free nitrogen. 20 mmoles of water and 20 mmoles of p-chloroacetanilide were introduced while stirring.

In catalyst system C, 1200 ml. of dry toluene, 20 mmoles of diethylzinc, and 20 mmoles of p-chloroacetanilide were introduced into a dry, nitrogen filled reaction vessel followed by 20 mmoles of water.

EXAMPLE I

The catalyst system A was stirred during 5 minutes and subsequently cooled to minus 78° C. While excluding air and moisture, 190 ml. of freshly distilled acetaldehyde, which had been cooled down to minus 78° C., were added. The mixture was stored during 24 hours at minus 78° C. under dry oxygen-free nitrogen. The reaction mixture was treated with 100 ml. of methanol, cut small and washed with methanol. After drying, 129 grams of a white, solid polymer were obtained, 97% of which was insoluble in acetone. Yield, 76%.

The same results were reached with the catalyst systems B and C in the same manner.

Table I shows the combined results of experiments that were carried out in the same manner, but with 20 mmoles of the stabilizer mentioned in the table instead of the p-chloracetanilide.

TABLE I

| Compound: | Yield in percent |
|---|---|
| N-phenylacetamide | 67 |
| N-phenylbenzamide | 63 |
| N-phenyl-dichloroacetamide | 54 |
| N-p-chlorophenylacetamide | 76 |
| N-o-chlorophenylacetamide | 65 |
| N-p-methylphenylacetamide | 65 |
| N-o-methylphenylacetamide | 77 |
| N-p-nitrophenylacetamide | 65 |
| N-p-methoxyphenylacetamide | 60 |
| N-p-hydroxymethylphenylacetamide | 71 |
| N-methyl-N-phenylacetamide | 69 |
| Phenyl-N-phenylcarbamate | 51 |
| Methyl-N-p-chlorophenylcarbamate | 68 |
| Methyl-N-p-nitrophenylcarbamate | 63 |

The experiment was repeated with a number of stabilizers. This time, the catalyst system according to A contained ½ (Table II) and 2 moles respectively (Table III) of stabilizer per mole of diethylzinc and per mole of water. For the rest, the proportions of the quantities were the same as for Table I.

TABLE II

| Compound: | Yield in percent |
|---|---|
| N-phenylacetamide | 64 |
| N-p-chlorophenylacetamide | 73 |
| N-p-nitrophenylacetamide | 57 |
| N-methyl-N-phenylacetamide | 66 |
| Phenyl-N-phenylcarbamate | 33 |

TABLE III

| Compound: | Yield in percent |
|---|---|
| N-phenylacetamide | 70 |
| N-ortho-methylphenylacetamide | 79 |
| N-para-methoxyphenylacetamide | 65 |

Instead of water, other co-catalysts may also be used, such as alcohols, amines and especially secondary amines. In Table IV a few additional data are mentioned.

TABLE IV

| Catalyst | Mmol | Co-catalyst | Mmol | Stabilizer | Mmol | Solvent | Ml. | Aldehyde 4 moles | Yield in percent |
|---|---|---|---|---|---|---|---|---|---|
| Et₂Zn | 20 | Water | 20 | Acetanilide | 20 | Toluene | 1,500 | Propionaldehyde | 55 |
| Et₂Zn | 20 | CH₃OH | 20 | do | 20 | do | 1,500 | Acetaldehyde | 45 |
| Pr₂Zn | 40 | Water | 40 | p-Chloroacetanilide | 40 | Hexane | 1,500 | Propionaldehyde | 54 |
| i-Bu₂Zn | 40 | do | 20 | Acetanilide | 40 | Toluene | 1,500 | Acetaldehyde | 80 |
| i-Pent₂Zn | 30 | Diphenylamine | 30 | m-Methylacetanilide | 30 | do | 1,500 | do | 70 |
| i-Pent₂Zn | 40 | Water | 20 | Acetanilide | 40 | do | 1,500 | do | 72 |
| Et₂Zn | 30 | n-Butylalcohol | 30 | do | 30 | Hexane | 1,500 | do | 43 |
| Et₂Zn | 30 | Phenol | 30 | do | 30 | Toluene | 1,500 | do | 49 |
| Et₂Zn | 30 | n-Butylamine | 30 | do | 30 | Hexane | 1,500 | do | 56 |

NOTE.—In this table, Et₂Zn stands for diethylzinc, Pr₂Zn for dipropylzinc, i-Bu₂Zn for di-isobutylzinc, and i-Pent₂Zn for di-isopentylzinc.

In Tables V, VI and VII a number of compounds are listed which may serve as stabilizers of the invention.

TABLE V

Aryl—NR—CO—R′

(n) = normal

| Aryl | R | R′ |
|---|---|---|
|  | CH₃ | —CH₃ |
| 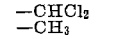 | C₂H₅ | —C₂H₅ |
| 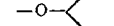 | C₂H₅ | —(n)C₈H₁₇ |
|  |  |  |
| CH₃— phenyl | (n)C₈H₁₇ | —(n)C₅H₁₁ |

TABLE VI

Aryl—NR—CO—R′

Aryl = phenyl (n) = normal

| R | —R′ |
|---|---|
| H— | —CH₃ |
| H— | —phenyl |
| H— | —CHCl₂ |
| CH₃— | —CH₃ |
| H— | —O—phenyl |
| H— | —N(phenyl)—CO—O—(n)C₄H₉ |
| C₂H₅— (n)C₃H₇— | —CH₃ |
| phenyl | —CH₃ |
| phenyl | —(n)C₄H₉ |
| cyclohexyl | —CH₃ |

TABLE VI—Continued

| R | —R₁ |
|---|---|
| (n)C₅H₁₁ | —C₂H₅ |
| 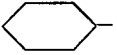 | 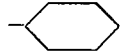 |
| (n)C₅H₁₁— | —(n)C₅H₁₁ |
| (n)C₆H₁₃— | 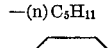 |
| (n)C₇H₁₅—<br>(n)C₈H₁₇— | —(n)C₇H₁₅<br>—(n)C₁₅H₁₁ |
| 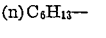 | —(n)C₁₅H₃₁ |
| 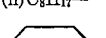 | —(n)C₁₇H₃₅ |
| (n)C₃H₇<br>H— | —(n)C₁₇H₃₅<br>—(n)C₁₅H₃₁ |

TABLE VII

Aryl—NR—CO—R'

(n)=normal

R=H

| Aryl— | —R' |
|---|---|
| 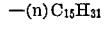 | —CH₃ |
| 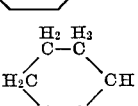 | —CH₃ |
| 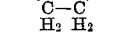 | —CH₃ |

(Additional rows of Table VII:)

| Aryl— | —R' |
|---|---|
| CH₃—⟨⟩— | —CH₃ |
| NO₂—⟨⟩— | —CH₃ |
| CH₃O—⟨⟩— | —CH₃ |
| HOCH₂—⟨⟩— | —CH₃ |
| Cl—⟨⟩— | —OCH₃ |
| NO₂—⟨⟩— | —OCH₃ |
| Cl-substituted phenyl | —(n)C₃H₇ |
| CH₃-substituted phenyl | —(n)C₈H₁₇ |
| NO₂-substituted phenyl | —O—⟨⟩ |
| CH₃O—⟨⟩— | —(n)C₇H₁₅ |
| Cl—⟨⟩— | —(n)C₈H₁₇ |

In every instance the catalyst system of the invention performs in a superior manner to those systems consisting simply of a single catalyst and a stabilizer, a catalyst and a co-catalyst, or a catalyst alone.

In the catalyst system A, the quantity of water was halved to 10 mmoles, and the final yield in polymer was 56%. When the amount of water was reduced to 30 mmoles the yield dropped to 36%.

When alcohols are used as co-catalysts, the useful upper limit lies below 1½ moles of alcohol per mole of dialkylzinc. The lower limit is less critical and, as with water, a gradual decrease in the quantity of alcohol will bring about a gradual decrease in the yield of polymer.

When secondary amines are employed, the upper limit is not critical, although the yield begins to drop at 2 moles of amine per mole of dialkylzinc.

The stabilizers are interchangeable without significant alteration of the yield of polymer or the ease of processing.

The aldehyde to be polymerized may be any arbitrary polymerizable aliphatic saturated aldehyde such as acetaldehyde, propionaldehyde, or butyraldehyde. Substituted aldehydes such as trichloroacetaldehyde or mixtures thereof may also be employed.

According to the present invention, the compounds which are used as stabilizers are those which have a catalytic influence on the interaction between dialkylzinc and the co-catalyst, so that the active agent is formed quickly. The stabilizer also has a stabilizing influence on the active agent formed, so that the catalyst system is not inactivated.

We claim:

1. In a catalyst system for polymerizing saturated aliphatic aldehydes having at least two carbon atoms which includes the constituents dialkylzinc and water as a co-catalyst, the improvement comprising the inclusion of a stabilizing agent for the catalyst system, said agent being selected from the group of compounds having the formula Ar—NR—CO—R', wherein Ar is a radical selected from the group consisting of substituted and unsubstituted monocarbocyclicaryl, said substituted monocarbocyclicaryl having substituents selected from the group consisting of halide, nitro, alkyl, alkyloxy, and hydroxyalkyl; R is a radical selected from the group consisting of hydrogen, alkyl, cycloalkyl and monocarbocyclicaryl and R' is a radical selected from the group consisting of alkyl, monocarbocyclicaryl, alkoxy, monocarbocyclicaryloxy, and carbamate, the water co-catalyst being present in an amount ranging from 0.4 to 1.2 moles per mole of dialkylzinc.

2. A catalyst system as set forth in claim 1, wherein the dialkylzinc compound is diethylzinc.

3. A catalyst system as set forth in claim 1, wherein a solvent is included in the catalyst system.

4. A catalyst system as set forth in claim 1, wherein approximately equal molar quantities of dialkylzinc, co-catalyst and stabilizing agent are employed.

5. A catalyst system as set forth in claim 1, wherein approximately 0.1 to 1 mole percent of dialkylzinc per mole of aldehyde is employed.

6. A catalyst system as set forth in claim 1 wherein the amount of stabilizing agent present in the system is from 0.2 mole to 4 moles per mole of dialkylzinc.

7. A catalyst system as set forth in claim 1, wherein Ar is phenyl.

8. A catalyst system according to claim 1 wherein the saturated aliphatic aldehyde is chlorine-substituted.

9. In the process for polymerizing saturated aliphatic aldehydes having at least two carbon atoms with a catalyst system which includes the constituents dialkylzinc and water as a co-catalyst, the improvement comprising the steps of premixing the dialkylzinc, the co-catalyst and a stabilizing agent selected from the group of compounds having the formula Ar—NR—CO—R', wherein Ar is a radical selected from the group consisting of substituted and unsubstituted monocarbocyclicaryl, said substituted monocarbocyclicaryl having substituents selected from the group consisting of halide, nitro, alkyl, alkyloxy, and hydroxyalkyl; R is a radical selected from the group consisting of hydrogen, alkyl, cycloalkyl, and monocarbocyclicaryl and R' is a radical selected from the group consisting of alkyl, monocarbocyclicaryl, alkoxy, monocarbocyclicaryloxy, and carbamate, the water co-catalyst being present in an amount ranging from 0.4 to 1.2 moles per mole of dialkylzinc; and thereafter contacting the resulting catalytic mixture with a saturated aliphatic aldehyde in the absence of oxygen at a temperature below approximately —40° C.

10. A process as set forth in claim 9, wherein the catalyst system is formed in a solvent.

11. A process as set forth in claim 9, wherein the aldehyde is acetaldehyde.

12. A process according to claim 9 wherein the saturated aliphatic aldehyde is chlorine-substituted.

References Cited
UNITED STATES PATENTS

| | | | |
|---|---|---|---|
| 3,131,165 | 4/1964 | Hermann et al. | 260—45.9 |
| 3,155,636 | 11/1964 | Kritzler et al. | 260—67 |
| 3,261,805 | 7/1966 | Griffiths et al. | 260—45.8 |
| 3,350,358 | 10/1967 | Hagemeyer et al. | 260—67 |

WILLIAM H. SHORT, Primary Examiner

L. M. PHYNES, Assistant Examiner

U.S. Cl. X.R.

260—429.9